United States Patent
Frost et al.

(10) Patent No.: US 11,225,333 B2
(45) Date of Patent: Jan. 18, 2022

(54) FUEL TANK INERTING SYSTEM

(71) Applicant: Airbus Operations Limited, Bristol (GB)

(72) Inventors: Neil Terence Frost, Bristol (GB); Ian Plastow, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 869 days.

(21) Appl. No.: 16/012,865

(22) Filed: Jun. 20, 2018

(65) Prior Publication Data
US 2018/0370650 A1    Dec. 27, 2018

(51) Int. Cl.
| | |
|---|---|
| *B64D 37/32* | (2006.01) |
| *A62C 3/08* | (2006.01) |
| *A62C 3/06* | (2006.01) |
| *B64D 13/06* | (2006.01) |
| *A62C 99/00* | (2010.01) |

(52) U.S. Cl.
CPC .............. *B64D 37/32* (2013.01); *A62C 3/065* (2013.01); *A62C 3/08* (2013.01); *A62C 99/0018* (2013.01); *B64D 13/06* (2013.01); *B64D 2013/0618* (2013.01)

(58) Field of Classification Search
CPC ............ B64D 37/32; A62C 3/065; A62C 3/08
See application file for complete search history.

(56) References Cited

U.S. PATENT DOCUMENTS

| | | | |
|---|---|---|---|
| 9,452,381 B2* | 9/2016 | Peacos, III | B64D 37/32 |
| 2005/0115404 A1 | 6/2005 | Leigh et al. | |
| 2008/0099618 A1 | 5/2008 | Zaki et al. | |
| 2016/0184793 A1* | 6/2016 | Peacos, III | B64D 37/32 422/129 |
| 2017/0007966 A1* | 1/2017 | Rekow | B64D 37/32 |

FOREIGN PATENT DOCUMENTS

| | | | |
|---|---|---|---|
| EP | 2 439 141 | 4/2012 | |
| EP | 2594487 A2 * | 5/2013 | B64D 37/32 |
| EP | 3 069 775 | 9/2016 | |
| EP | 3117891 A1 * | 1/2017 | B64D 37/32 |
| WO | 02/28714 | 4/2002 | |

OTHER PUBLICATIONS

Combined Search and Examination Report for GB 1709898.9, dated Dec. 19, 2017, 7 pages.

* cited by examiner

*Primary Examiner* — Richard R. Green

(74) *Attorney, Agent, or Firm* — Nixon & Vanderhye P.C.

(57) ABSTRACT

A fuel tank inerting module, a fuel tank inerting system for an aircraft, and a method of providing fuel tank inerting systems for aircraft are disclosed. The module includes an inlet for ullage gas from a fuel tank, a catalyst, an outlet for the ODA, sensors, filters and valves. The module is sized and shaped to fit in a range of positions near to fuel tanks in various aircraft. The inerting system includes one or more modules connected to the fuel tanks and a controller to control passage of ullage and ODA between the fuel tanks and the modules. The method includes providing an inert gas generation module compatible with any suitable aircraft, positioning one or more modules in an aircraft at locations near to a fuel tank to be inerted.

20 Claims, 4 Drawing Sheets

FUEL TANK INERTING SYSTEM

CROSS RELATED APPLICATION

This application claims priority to United Kingdom (GB) patent application 1709898.9, filed Jun. 21, 2017, the entire contents of which is hereby incorporated by reference.

FIELD OF TECHNOLOGY

The present invention relates to a system for inerting fuel vapour mixed with air in a fuel tank and more particularly to a system for inerting fuel vapour and air in an aircraft fuel tank.

BACKGROUND

It is well known to provide fuel tank inerting systems for aircraft, in particular for commercial aircraft. Ullage in a fuel tank comprises the gaseous content of the tank above the fuel. Highly flammable ullage comprising air and fuel vapour can form above fuel stored in aircraft fuel tanks and certain conditions such as a low fuel level in the tank and rising temperatures can create conditions which, with a single spark, can ignite the fuel and lead to a catastrophic explosion. Flammable ullage in aircraft fuel tanks is also a fire/explosion risk in a lightning strike on the aircraft. Electrical sparks in the ullage volume of the tank, caused by the strike, can be catastrophic unless the ullage is inerted.

For military aircraft, the risk of fire or explosion of the fuel tanks is increased by the threat of a breach of the fuel tanks by bullets or missiles from enemy action.

Therefore, fuel tank inerting systems for both civil and military aircraft are now regarded as key aircraft systems.

In order to mitigate such risks, fuel tank inerting systems now fitted to commercial aircraft generate oxygen depleted air (ODA) in the fuel tanks to replace flammable ullage. The replacement of air and fuel vapour by oxygen depleted air greatly reduces the risk of fire or an explosion from an unwanted ignition source within the tank.

Many current fuel tank inerting systems operate by converting air into ODA which is both nitrogen enriched and oxygen depleted. Such ODA becomes automatically nitrogen-enriched, when the oxygen is removed, and thus far more inert and unable to explode. The ODA is generated on board the aircraft when conditioned engine bleed air from a conditioned service air system (CSAS) is passed through an air separation module (ASM). The ASM contains hollow permeable membrane fibres which remove oxygen molecules from the air. Oxygen enriched air is then vented overboard. Nitrogen-enriched air (NEA), otherwise ODA remains, which is then pumped into the aircraft fuel tanks to displace the ullage in the tanks.

Catalytic converters have been proposed which use a catalytic inerting device for producing the ODA by reaction of fuel vapour from the fuel tank with air and a separator device for separating carbon dioxide from the ODA before feeding the ODA back to the fuel tank to render the ullage inert. Carbon dioxide may be removed from the ODA before sending it back to the fuel tank.

ASMs may be grouped together, together with ancillary valves, sensors, filters and the like comprised in the inerting system. The ASMs are mounted centrally on the aircraft with pipes leading from each ASM to fuel tanks in the aircraft wings. The size and number of ASMs will vary with the size of the aircraft, with a typical large commercial aircraft mounting two or more pairs of ASMs on each side of the fuselage.

If catalytic inerting devices are used instead of or in addition to ASMs, they will be located in the same positions on the aircraft as the ASMs.

BRIEF SUMMARY OF THE INVENTION

According to a first aspect of the present invention there is provided a fuel tank inerting module for an aircraft, the module including an inlet for fuel tank ullage gas, means to reduce flammability of the ullage gas to create reduced flammability ullage, an outlet for the reduced flammability ullage, and sensors, filters and valves as required to sense, filter and adjust fluid flow into, through and out of the module, the module including quick release connecting means for connection to the aircraft.

The module of the invention may thus be quickly and easily fitted to or removed from an aircraft. Thus, for maintenance or repair, for example, a module is easily removed from the aircraft and re-installed. Thus as a matter of practice, modules may be repaired and maintained in a specialist maintenance facility. Being modular, all the advantages of standardisation may apply to use of the modules: supply of replacements will be more straightforward and cheaper than the case where bespoke inerting systems are used, owing to the ready availability of replacements and the more competitive pricing normally applicable to standardised products. Thus the delays in waiting for manufacture or repair of bespoke systems will be avoided. Alternatively, it will no longer be necessary to keep spares or whole systems on standby, in case of failure of a bespoke system.

The quick release connecting means may include a gas inlet, a gas outlet and a connection for a power supply for the module. All necessary feeds into the module may thus be simply accomplished through the quick release connection.

The quick release connecting means may be operable with a single step, such as tightening/untightening a screw or nut or engaging/releasing a catch such as an over-centre catch. In some circumstances, for example with a particularly large or complex shaped module, more than one operation may be necessary to engage/release the quick release connecting means. Thus, for example, a large module secured along one side by a lip engaging behind an overhang may require more than one fastener to secure an opposite side of the module.

Conveniently, the module includes a cover to cover all the active components thereof. The cover may be used to create a hermetic seal around the components of the module to protect the components from ingress of any moisture or dirt.

The module may be sized for a selected range of aircraft whereby a single module is sufficient to service a said aircraft requiring least ullage inerting and whereby a multiple of said modules may be used to service aircraft requiring more ullage inerting. The advantages of standardisation, based on a single relatively small module are therefore obtained, using the invention, for aircraft ranging in size from small to extremely large.

The means to reduce flammability of the ullage gas may comprise a catalyst to produce ODA by reaction of ullage fuel vapour and air together, in the presence of the catalyst. The use of such a catalytic means avoids the requirement for a CSAS from the engines, with all the associated pipework. Considerable weight and complexity is therefore avoided.

Alternatively, the means to reduce flammability of the ullage gas comprises an air separation module to produce NEA to replace the ullage. Thus the invention may be used in conjunction with present ASM inerting systems.

According to a second aspect of the invention, there is provided a fuel tank inerting assembly comprising a module according to the first aspect of the invention and a dock for attachment to the aircraft, said dock being adapted releasably to mount the module to the aircraft via the quick release connecting means.

The quick release connector preferably makes all necessary functional connections between the module and the dock. Thus, each dock may have a power connector for electrical power, a gas inlet and a gas outlet.

According to a third aspect of the invention, there is provided a fuel tank inerting assembly group including at least two modules according to the first aspect and a multiple dock for receiving the modules.

The multiple dock may therefore be connectible to one or more fuel tanks via a single connector.

The multiple dock may comprise single docks connected together with standardised connection means. The docks may thus be adapted for rapid connection, for example snap connection, to an adjacent dock whereby both modules connected to the docks may work together in series or in parallel with each other.

Thus, according to the invention, both a standardised module and a standardised dock for the module afford an extremely versatile system, with rapid, simple and cheap interchangeability, for repair and maintenance.

A gas transfer port preferably allows transfer of gas such as ullage or engine bleed air into a dock or allows transfer of ODA out of a dock, for example to a fuel tank being inerted or to a neighbouring dock in a multi-dock.

Gas transfer ports may be self-sealing. Thus, if a port is not in use, it will always remain closed.

The dock preferably contains any piping to route gases into and out of a module and to adjacent docks, and any electrical power connection to a module from the aircraft or to/from an adjacent module.

A module may be partly or fully powered by energy harvested locally, for example, by photo-voltaic cells, by thermo-electric cells or by microbial fuel cells. In this case, it is possible that such cells may be attached directly to the module and reduced power or no power may be required from the dock. However, in most cases it is likely that such locally harvested energy will still be fed to the module through the dock. Also, in most cases an additional power supply from the aircraft will be necessary.

Photo-voltaic cells may be positioned anywhere on the aircraft with access to direct sunlight. Thermo-electric cells may be positioned to take advantage of the heat generated by the action of the catalytic conversion process of the module and are preferably incorporated into the module. Microbial fuel cells may be positioned in the aircraft waste system, and may be used in particular for those modules positioned nearest to the aircraft fuselage. If the fuel system itself is used to power microbial fuel cells, then modules located anywhere may use this method of energy supply.

According to a fourth aspect of the present invention there is provided a fuel tank inerting system for an aircraft, the system including one or more modules according to the first aspect and one or more fuel tanks, said modules being in operative communication with one or more ullage volumes of the fuel tanks, and control means to control passage of ullage gas and reduced flammability ullage between the one or more fuel tanks and the one or more modules.

One or more said modules may be located within or adjacent one or more said fuel tanks for direct access to a said ullage volume. The modules may be of very diminutive size, for example contained in a box 50 cm by 30 cm by 30 cm or less where a catalytic system is used. They may therefore be located adjacent to, or even within, the fuel tanks. Thus, they may conveniently be mounted on a wing spar or within a dry bay mounted near to or on a fuel tank wall. Extensive pipework may therefore be avoided which would otherwise be necessary to connect inerting systems located remotely, for example in the aircraft fuselage, to wing fuel tanks which may extend as far away as wing extremities.

The inerting system may include means such as fans to circulate the ullage gas within the one or more fuel tanks. Such fans or other means are conveniently comprised in the modules and may assist complete inerting of the ullage volume. For small modules or modules whose size places few restrictions upon their placement on the aircraft, placement of modules in locations where natural movement of fuel and gasses within the fuel system may ensure sufficient fuel tank inerting without the use of fans or other means to move the gasses through some or all of the modules. Any natural convection of ullage within the fuel system may therefore be taken advantage of.

In view of the potentially increased number of modules, compared with the number of present inerting arrangements used on commercial aircraft, some or all of the modules may be networked together to operate as one or more controlled systems.

Control may be autonomous, within the system, or may be linked to other aircraft systems. Current inerting systems are generally simply active or inactive and for various reasons are usually kept active during the flight phase of the aircraft. However, a system according to the invention may have potentially redundant modules, for certain phases of operation. Energy may potentially be saved by a system according to the invention. In addition, features of the system such as assisted convection of gasses may be controlled module by module.

The potentially increased number of modules on an aircraft may remove the need for any system redundancy to protect against unit failure. Failure of a single module, for example, may be compensated for by increased operation of one or more modules which are still active. Such increased operation may take the form of operating at a higher power level or by operating for longer periods.

The inerting system may include a CSAS to supply conditioned engine bleed air from an engine of the aircraft to the modules. Alternatively, the fuel tanks may be pressurized by engine bleed air which may also be used in the fuel tank inerting system.

The inerting system may conveniently include one or more of the docks via which the modules will be in operative communication with one or more ullage volumes of the fuel tanks.

According to a fifth aspect of the present invention there is provided a method of providing a fuel tank inerting system according to the fourth aspect for a range of aircraft of varying size, the method including the steps of determining a minimum size of inerting module required for the smallest aircraft in the range, designating the said minimum size module as a standard module for use in the range of aircraft and providing the standard module for installation in aircraft in the range in multiples as required.

BRIEF DESCRIPTION OF THE DRAWINGS

The present invention will now be described, by way of example only, with reference to the following drawings in which.

Where like components are shown in different drawings, like reference numerals are used for ease of recognition.

DETAILED DESCRIPTION OF THE INVENTION

Figure 1:
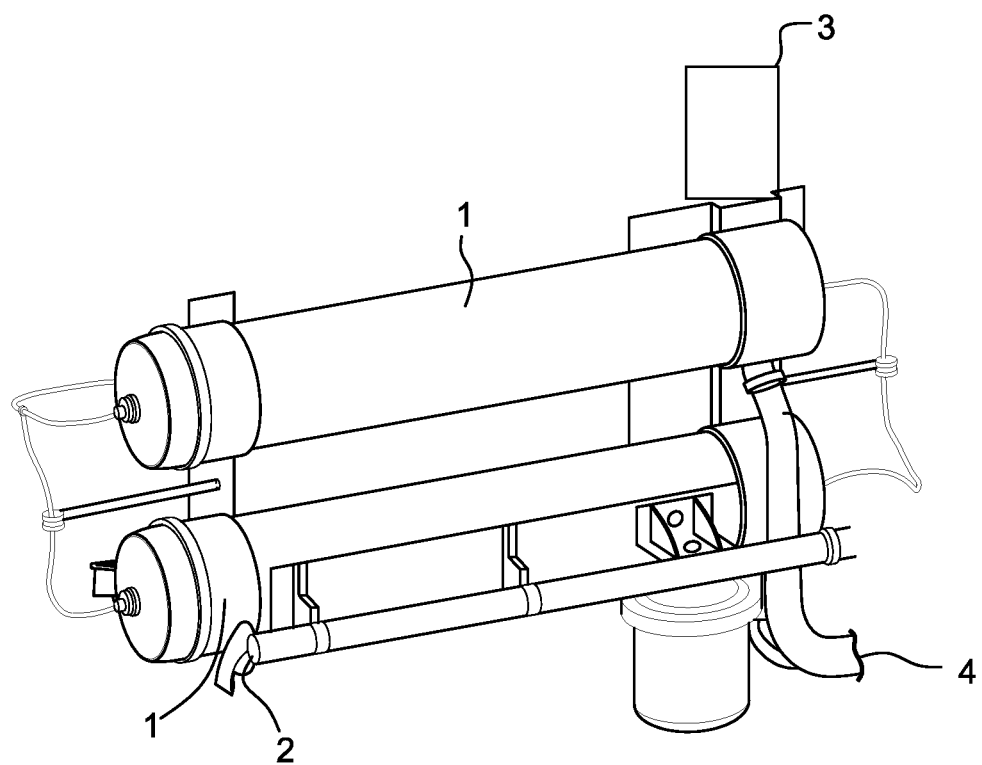
FIG. 1 is a perspective view of an inerting arrangement according to the prior art.

With reference to FIG. 1, there is shown a prior art arrangement, as used for inerting fuel tank ullage in an aircraft. The arrangement comprises two ASMs 1 linked to various pipework. In particular, an air inlet 2 is shown, together with an NEA outlet 3 and an oxygen enriched air (OEA) outlet 4. The air inlet will normally be from a CSAS, receiving air from an engine bleed on the aircraft. The NEA outlet 3 is connected to one or more fuel tanks (see FIG. 3) to replace the fuel vapour-filled ullage. The OEA outlet 4 is vented overboard.

As can be seen from FIG. 1, the current inerting arrangement is not designed for close packaging or easy installation. It is one metre or more in length, approximately the same height or slightly less and is clearly susceptible to accidental damage, with all the constituent parts being quite exposed. In current Airbus aircraft, the arrangement is mounted underneath the fuselage of the aircraft in the air conditioning pack area, within the belly fairing.

From there, pipework connects the arrangement to the aircraft central fuel tank and to the wing fuel tanks. It will be appreciated that the pipework required is quite extensive. In long range aircraft, in particular, this pipework may extend to over 100 metres. In addition, at least one such inerting unit is required on short range aircraft and three or more on long range aircraft. The overall complexity, cost, weight and vulnerability of such prior art inerting systems is therefore significant. In addition, repair and maintenance to each arrangement and to pipework must be carried out on the aircraft as the unit is not easily removed or disassembled.

Figure 2:
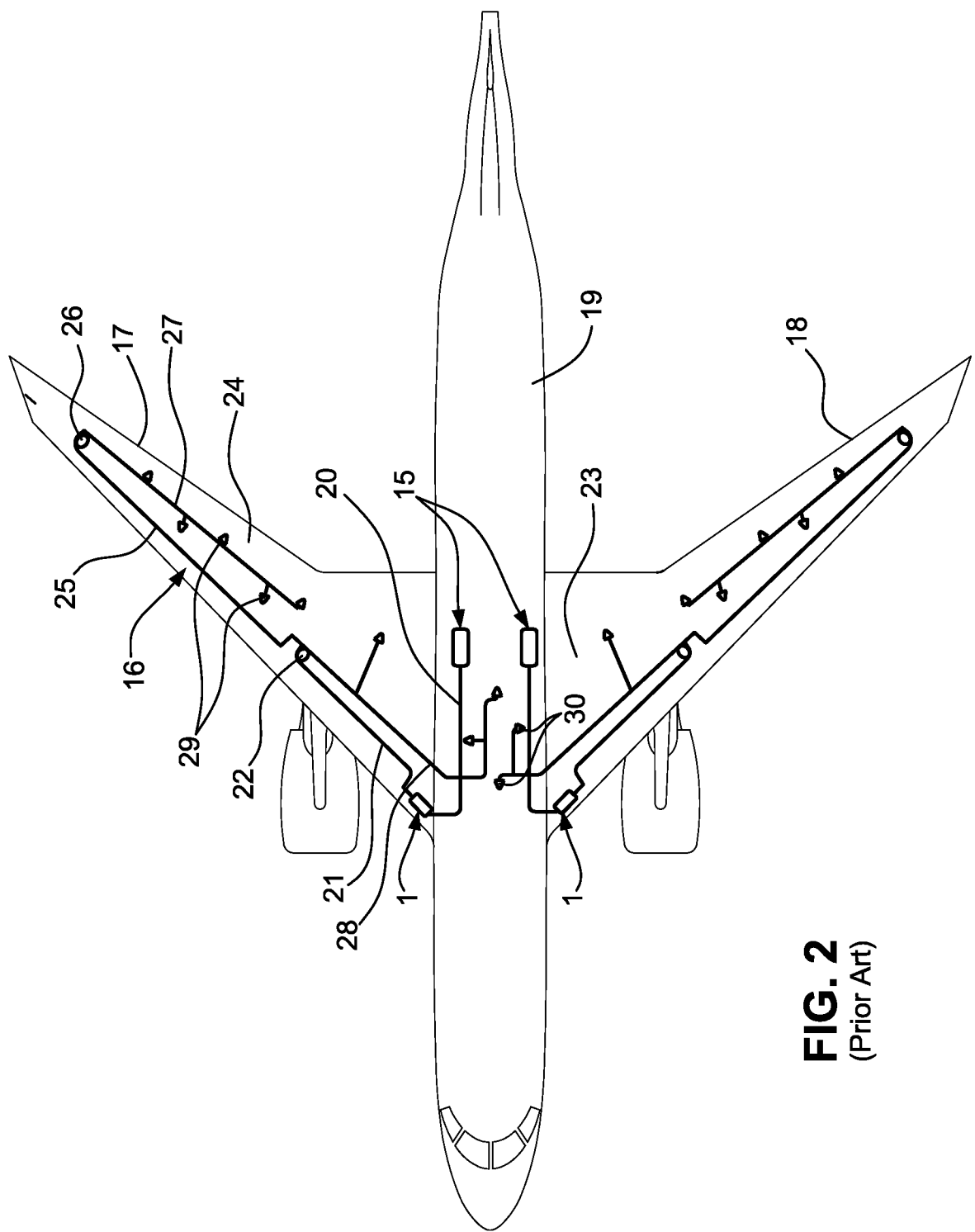
FIG. 2 is a schematic plan view of a commercial aircraft fitted with an inerting system according to the prior art.

FIG. 2 shows an Airbus A350 aircraft fitted with a conventional fuel tank inerting system. The system comprises two pairs of ASMs 1, one pair in each wing 17, 18, two CSASs 15 and sundry pipework 16 extending throughout both wings 17, 18 and within the fuselage 19.

It will be seen from the drawing that engine bleed air is firstly piped from the two CSASs 15 through pipes 20 to ASMs 1. ODA is then pumped from the ASMs 1 along pipes 21 to junction 22, adjacent central fuel tank 23 and wing fuel tank 24. From junction 22, ODA travels in two directions. Firstly, pipe 25 transfers ODA to junction 26, from whence it is distributed into wing tank 24 via wing in-tank gas distribution network 27. Secondly, centre in-tank gas distribution network 28 distributes ODA within the centre fuel tank 23. Each in-tank gas distribution network 27, 28 distributes the ODA throughout the tank via a respective series of spaced outlets 29, 30.

It will be appreciated from the above that an inerting system, with such a lengthy pipe distribution network, will have a number of disadvantages. Firstly, the pipe system adds considerable cost and weight to the aircraft. Secondly, a network of this length will incur considerable pumping losses which will in turn incur the weight and energy penalties of providing sufficient pumping power. Thirdly, maintenance and reliability issues arise from installation of any aircraft system. Fourthly, installation of such a large system can be very costly, time consuming and can be disruptive to other systems and their installation and further weight, space and maintenance penalties can accrue.

Figure 3:
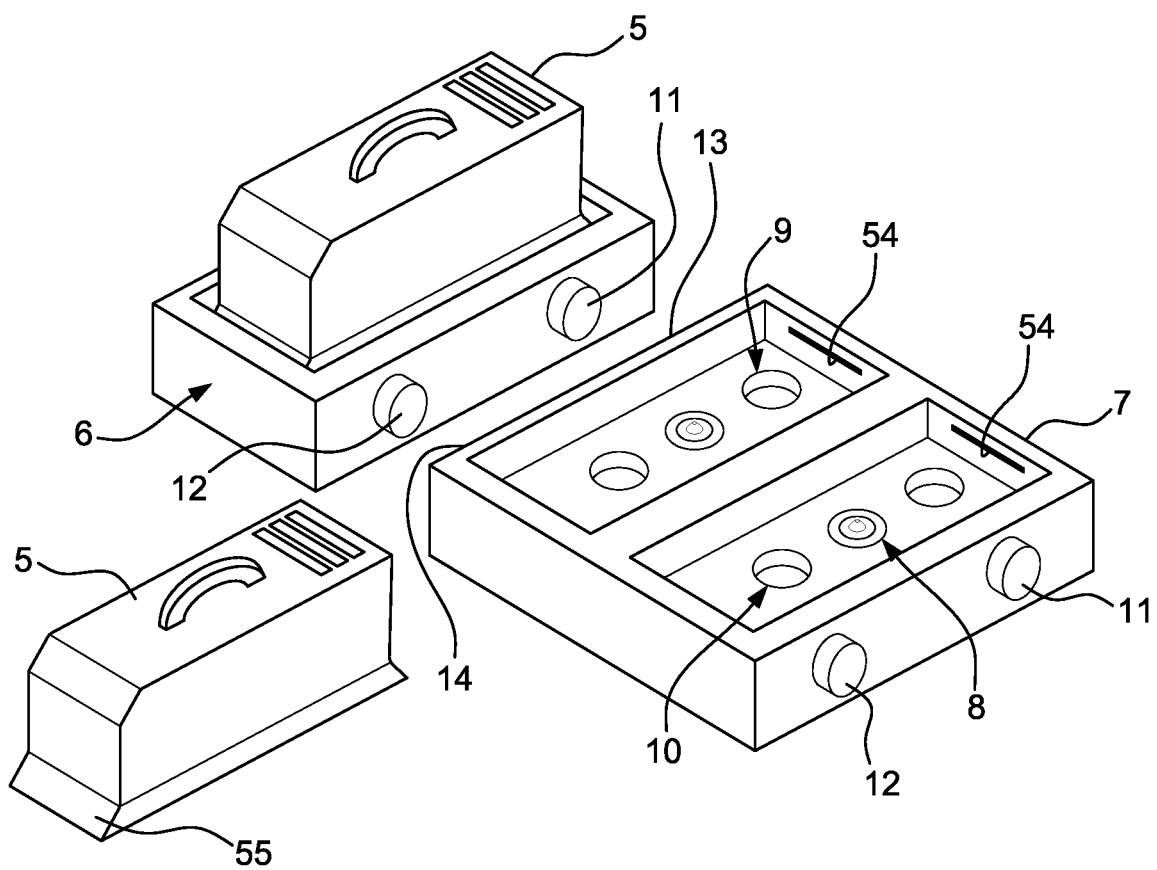
FIG. 3 is a schematic perspective view of modules and docks according to the invention.

FIG. 3 shows modules and docks according to the invention. A catalytic inerting module 5 is shown both separately and docked in a dock 6. Also shown is a multi-dock 7, comprised of a pair of docks 6 and adapted to receive two modules 5. The module 5 is fitted with a quick release connector having a movable lip (not shown) engageable with a recess 54 in the dock 7 for connection of the module 5 to the dock 6 or multi-dock 7. A protruding edge 55 at the opposite end of the module 5 engages a similar recess (not shown) in the dock 6 or multi-dock 7. The quick release connector connects the module 5 securely to the dock 6 and makes all necessary functional connections between the two. Specifically, each dock 6 has a power connector 8 for electrical power, a gas inlet 9 and a gas outlet 10. The gas inlet 9 may take ullage from the fuel tank being inerted or may receive air from an engine bleed, for example. The gas outlet 10 passes ODA to the fuel tank being inerted.

Self-seal gas transfer port 11 allows transfer of gas such as ullage or engine bleed air into the dock 6. Self-seal gas transfer port 12 allows transfer of ODA out of the dock 6, either to a fuel tank being inerted or to a neighbouring dock 6 in a multi-dock 7. If a dock 6 is connected to another dock or docks 6 to form a multi-dock 7, connection is made by gas transfer port 11 being connected in a self-seal manner to a co-operating transfer port 13 in the adjacent dock and by gas transfer port 12 being connected, also in a self-seal manner, to co-operating transfer port 14. The skilled reader will understand that, for adjacent docks to work in parallel with each other, gas transfer port 11 will connect internally of the dock to both gas inlet 9 and to co-operating transfer port 13. Similarly, gas transfer port 12 will connect internally of the dock to both gas outlet 10 and to co-operating transfer port 14. Because ports 9-14 are all self-sealing, if a port is not in use and connected either to a module or to an adjacent dock, it will always remain closed.

With the modules of the invention, all active components of the inerting system are preferably contained within each module. Active components may include: a catalytic conversion unit, valves, filters and sensors. The dock preferably contains any piping to route the gases into and out of the module and to adjacent docks, and any electrical power connection to the module from the aircraft or to/from an adjacent module.

Figure 4:
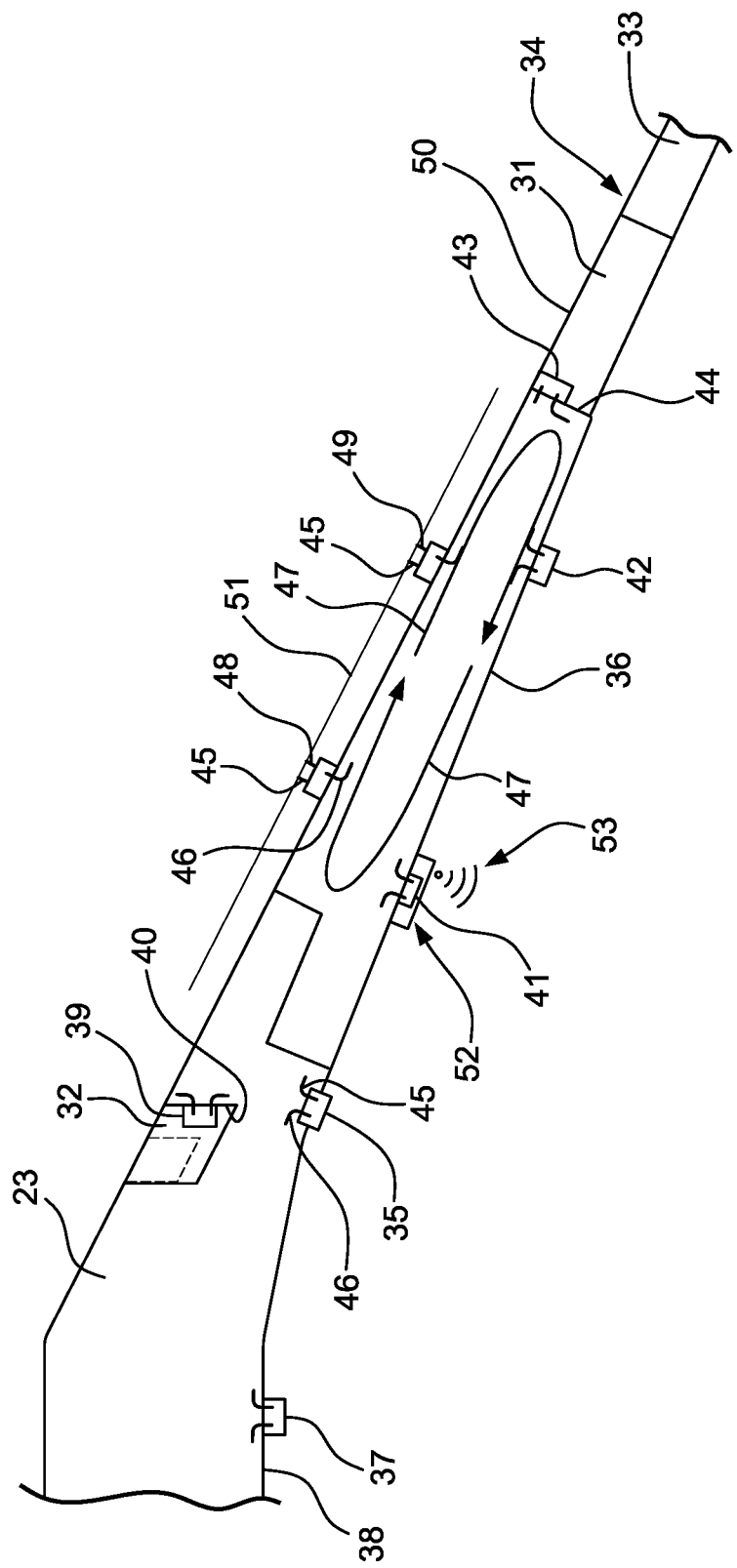
FIG. 4 is a schematic plan view of an aircraft wing and part central fuel tank fitted with an inerting system according to the invention.

Referring to FIG. 4, an aircraft wing box 34 and centre fuel tank 23 according to the invention are shown schematically. The wing box 34 contains a wing fuel tank 24, a surge tank 31 which is normally dry, an engine dry bay 32 and a wing tip dry bay 33. For a very large aircraft, further fuel tanks onboard the aircraft are possible. For example, a further fuel tank may be located in the horizontal tailplane. The module and system of the invention are equally applicable to fuel tanks wherever located on the aircraft.

Referring to the drawing, fuel tank inerting module 35 is attached to a rear spar 36 of the wing box to treat the centre tank 23. Inerting module 37 is attached to a rear wall 38 of the centre tank 23 and inerting module 39 is attached to a dry bay wall 40 of the centre tank 23.

For the wing fuel tank 24, inerting treatment is shown being carried out by five inerting modules. Modules 41 and 42 are attached to the rear spar 36 and take their oxygen from the tank ullage. Module 43 is attached to an end wall 44 of the wing tank 24 and again takes its oxygen from the tank ullage.

Because modules 35, 37, 41, 42, 43 are all located in contact with a respective fuel tank 23, 24 to be inerted, and because the source of oxygen for the conversion to ODA is the ullage itself, there is no need for any pipework to connect the module to a fuel tank, to each other or to a source of air. All five modules have direct access to an interior ullage volume of the respective tank 23, 24 via an inlet pipe 45 and an outlet pipe 46.

Arrows 47 indicate a recirculatory path of the ullage within the wing tank 24. This path is caused and/or encouraged by gas propulsion means in the form of a fan (not separately shown) within each module 35, 37, 41, 42, 43. In addition, each inlet pipe 45 is directed, within its respective fuel tank, to suck in ullage from one direction and each outlet pipe 46 is directed to blow out ODA in the opposite direction, thereby to direct the gases in a constant recirculating motion within the fuel tank.

In practice, the modules which inert the ullage in the centre tank 23 would also be positioned, and their inlet and outlet pipes 45, 46 directed, to cause a similar recirculatory gas motion within the tank. Such specific positioning is not necessarily shown in FIG. 4, which is merely schematic.

Also shown positioned in a manner to inert ullage within the wing tank 24 are piped modules 48, 49, attached to a front spar 50 of the wing box 34. Modules 48, 49 are shown merely for the sake of illustration.

Piped modules 48, 49 may however operate in conjunction with the stand alone modules if it is more efficient to do so. Here, a bleed air pipe 51 supplies heated air from an engine (not shown) for anti-icing purposes to a leading edge structure (not shown) of a wing of which the wing box forms a part. Where convenient, such bleed air, whether cooled or otherwise, may be drawn off the pipe 51 and used in the inerting system. As shown, inlet pipes 45 of modules 48, 49 draw bleed air from pipe 51 to pass through the module 48, 49 and emerge as ODA into the wing tank 24 through outlet pipes 46.

In the case of all the modules shown in FIG. 4, each module is releasably mounted to a dock (not separately shown) which is fixed to the outside wall of the respective fuel tank.

Looking at module 41, this module is shown having an energy harvesting function 52 and a wireless communications function 53. Such functions may be employed on every module, as far as practical, but are only shown on module 41 here.

Wireless communication, between modules and from the modules to a central fuel tank inerting control computer, may be carried out efficiently to control the overall degree of fuel tank inerting within the aircraft, depending upon altitude, fuel level, etc., and also the degree of inerting in a region surrounding each module. Various variables such as on/off control, self-clean mode, fan speed, valve opening, filter operation, diagnostic information such as catalyst running temperature or oxygen level at the module output may be controlled autonomously, wirelessly or, if preferred, by wired communications with the modules.

The embodiments described herein are respective non-limiting examples of how the present technology, and aspects of the present technology, may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The word "or" as used herein is to be taken to mean "and/or" unless explicitly stated otherwise.

The invention claimed is:

1. A fuel tank inerting module for an aircraft, the module including a protruding edge, an inlet for fuel tank ullage gas, means to reduce flammability of the ullage gas to create reduced flammability ullage, an outlet for the reduced flammability ullage, and sensors, filters and valves to sense, filter and adjust fluid flow into, through and out of the module, at least one dock releasably connected to the aircraft, wherein the at least one dock comprises an inner side to releasably secure the protruding edge therewithin.

2. The module according to claim 1, in which the at least one dock includes a gas inlet, a gas outlet and a connection for a power supply for the module.

3. The module according to claim 1, in which the module is sized for a selected range of aircraft whereby a single module is sufficient to service said aircraft requiring least ullage inerting and whereby a multiple of said modules is used to service aircraft requiring more ullage inerting.

4. The module according to claim 1, in which the means to reduce flammability of the ullage gas comprises a catalyst to produce oxygen depleted air (ODA) by reaction of fuel vapour in the ullage with air in the presence of the catalyst.

5. The module according to claim 1, in which the means to reduce flammability of the ullage gas comprises an air separation module to produce nitrogen enriched air to replace the ullage.

6. A fuel tank inerting assembly group including at least two modules according to claim 1 and multiple docks for receiving the modules, the multiple docks being connectible to one or more fuel tanks via a single connector.

7. The fuel tank inerting assembly group according to claim 6, in which the multiple dock comprises single said docks connected together with standardised connection means.

8. A fuel tank inerting system for an aircraft, the system including one or more modules according to claim 1 and one or more fuel tanks, said modules being in operative communication with one or more ullage volumes of the fuel tanks, and control means to control passage of ullage gas and reduced flammability ullage between the one or more fuel tanks and the one or more modules.

9. The fuel tank inerting system according to claim 8, in which one or more said modules are located within or adjacent one or more said fuel tanks for direct access to a said ullage volume.

10. The fuel tank inerting system according to claim 8, wherein the control means to control passage of the ullage gas is one or more fans adapted to circulate ullage gas within the one or more fuel tanks.

11. The fuel tank inerting system according to claim 8, in which one or more said modules are located in dry bays of the aircraft.

12. The fuel tank inerting system according to claim 8, including a conditioned service air system to supply conditioned bleed air from an engine of the aircraft to the one or more modules.

13. The fuel tank inerting system according to claim 8, including one or more said docks via which one or more said modules are in operative communication with one or more ullage volumes of the fuel tanks.

14. An aircraft wing including a fuel tank inerting system according to claim 8.

15. An aircraft including a fuel tank inerting system according to claim 8.

16. A method of providing a fuel tank inerting system according to claim 8 for a range of aircraft of varying size, the method including the steps of determining a minimum size of inerting module required for the smallest aircraft in the range, designating the said minimum size module as a standard module for use in the range of aircraft and providing the standard module for installation in aircraft in the range, in multiples as required.

17. The module according claim 1, wherein the protruding edge is a lip, and the inner side includes a recess.

18. An aircraft fuel tank inerting assembly, comprising:
at least one inerting module including a lip;
at least one dock including a recess and configured to attach to the aircraft;
wherein the recess releasably secures the lip therewithin to the at least one inerting module to the at least one dock; and,
the at least one inerting module comprising an inlet for fuel tank ullage gas, a fan to circulate the ullage gas within the fuel tank, a catalyst to produce oxygen depleted air, an outlet for the oxygen depleted air and, a plurality of sensors to adjust the flow into, through and out of the at least one inerting module.

19. The aircraft fuel tank inerting assembly of claim 18, wherein the at least one dock comprises a power connector for electrical power, a gas inlet, and a gas outlet.

20. The aircraft fuel tank inerting assembly of claim 18, wherein the modules are located within or adjacent one or more aircraft fuel tanks.

* * * * *